United States Patent [19]
Kenny et al.

[11] Patent Number: 5,394,892
[45] Date of Patent: Mar. 7, 1995

[54] CPR PROMPTING APPARATUS

[75] Inventors: Thomas M. Kenny; Peter R. Brewer, both of South Fremantle, Australia

[73] Assignees: K J Mellet Nominees Pty Ltd, Perth, Australia; Stanley Louis Mowbray Eskell, London, United Kingdom

[21] Appl. No.: 930,676
[22] PCT Filed: Apr. 2, 1991
[86] PCT No.: PCT/AU91/00121
§ 371 Date: Nov. 19, 1992
§ 102(e) Date: Nov. 19, 1992
[87] PCT Pub. No.: WO91/15267
PCT Pub. Date: Oct. 17, 1991

[30] Foreign Application Priority Data
Apr. 2, 1990 [AU] Australia ............... PJ9414

[51] Int. Cl.6 ............... A62B 37/00; A61H 31/00
[52] U.S. Cl. ............... 128/897; 601/41; 434/265
[58] Field of Search ............... 128/28, 897–898; 434/265; 607/5; 364/413.01–413.03; 601/41

[56] References Cited
U.S. PATENT DOCUMENTS 4,193,064  3/1980  Snyder .
4,237,872  12/1980 Harrigan .
4,491,423  1/1985  Cohen .
4,583,524  4/1986  Hutchins .
4,588,383  5/1986  Parker .
4,863,385  9/1989  Pierce .

FOREIGN PATENT DOCUMENTS

A41776   11/1985  Australia .
A78133    3/1988  Australia .
PI3181    1/1989  Australia .
PI3831    1/1989  Australia .
B20895    8/1991  Australia .
0186713   9/1986  European Pat. Off. .
2284345   4/1976  France .
WO8900416 1/1989  WIPO .

OTHER PUBLICATIONS

CPR Instruction Leaflet-pp. 1–5 (date unknown).

Primary Examiner—Kyle L. Howell
Assistant Examiner—J. Lacyk
Attorney, Agent, or Firm—Ladas & Parry

[57] ABSTRACT

An apparatus for prompting an operator in the performance of cardio pulmonary resuscitation. The apparatus comprises a casing housing, a keypad with input switches, a display with light emitting devices, audible buzzers and a control circuit embodiment in a programmed microprocessor and associated circuitry. Input prompting signals are controlled by the control circuit to prompt the operator to ascertain the presence of a pulse of the casualty, specify the number of rescuers performing the resuscitation, and specifiy the age status of the casualty. The control circuit prompts the operator to perform either or both heart compression and lung inflation on the casualty at a prescribed rate.

13 Claims, 4 Drawing Sheets

CPR PROMPTING APPARATUS

BACKGROUND OF THE INVENTION

This invention relates to an apparatus for prompting the performance of cardio pulmonary resuscitation (CPR).

In this specification, CPR comprises the performance of expired air resuscitation (EAR) concurrently with external cardiac compression (ECC) in accordance with the specifications laid down by the Australian Resuscitation Council.

EAR is used on persons suffering from respiratory arrest, the essential signs of which are unconsciousness and absent respiration. On the other hand, ECC is used on persons suffering from cardiac arrest, the essential signs of which are unconsciousness, absent pulse and absent respiration.

The performance of EAR involves the following steps:
the rescuer pinching the casualty's nostrils between finger and thumb of the hand, and extending the head of the casualty to maintain the airway open;
the rescuer opening his/her mouth wide and taking a deep breath;
the rescuer placing his/her mouth firmly over the casualty's mouth making an air tight seal;
breathing firmly into the casualty's mouth, watching to see that the chest rises;
the rescuer removing his/her mouth, watching to see the chest of the casualty fall and listening for the breath exhaling;
continuing rhythmically the breathing and watching procedure in accordance with a prescribed rate dependent upon the age of the casualty.

The performance of ECC involves the following steps:
placing the casualty on his back on a firm surface;
kneeling beside the casualty's chest at right angles to the line of his body;
locating the lower half of the sternum of the casualty;
the rescuer placing the heel of one hand at this point, keeping the palm and fingers raised from the chest;
covering this hand with the heel of the other hand;
the rescuer keeping his/her arm straight, rocking forward over the casualty until the rescuer's shoulders are vertically above their hands;
pressing briskly down to depress the sternum about five centimeters;
rocking backwards releasing the pressure from the sternum;
continuing rhythmically with the aforementioned depression and release of the sternum at a prescribed rate dependent upon the age of the casualty.

In the case of cardiac arrest, it is necessary to use a combination of EAR and ECC, i.e. CPR. The performance of CPR varies depending upon whether one rescuer or two rescuers are available, whereby in the case of two rescuers one may perform EAR and the other ECC contemporaneously. In the case of there being only one rescuer, it is necessary for the one person to perform both EAR and ECC.

In practice, upon encountering a person who has suffered respiratory or cardiac arrest, the first symptom which can be readily ascertained is whether the person is unconscious or not. In accordance with the specifications set down by the Australian Resuscitation Council, at this stage the air way of the unconscious person should be cleared and opened to ensure that the person can breath.

The next obvious symptom which can be ascertained at this stage is whether the casualty is breathing or not. Accordingly, after the air way is cleared and opened, the casualty must be checked to determine whether they are breathing or not. In the event that they are not breathing, the rescuer must immediately enter into EAR technique, providing five inflations as rapidly as possible since time is vital at this stage.

After this, the characterising symptom for cardiac arrest can be checked, i.e. whether the pulse of the casualty is present or not, to ascertain whether the casualty is suffering from respiratory or cardiac arrest.

If the pulse is present, it can be ascertained that the casualty is suffering from respiratory arrest only and accordingly EAR procedure may be continued at the rate of twelve inflations per minute for an adult casualty and at the rate of twenty inflations per minute for a child or baby casualty.

This procedure is continued for one minute at which time the pulse is again checked, as the heart may have stopped beating. If the pulse is still present, EAR is continued at the prescribed rate for further periods of two minutes each, with the pulse being checked for five seconds at the termination of each two minute period, until the casualty recommences breathing.

If at any time during a pulse check it is determined that the pulse is not present, then the rescuer must immediately enter into ECC procedure and perform this in conjunction with EAR procedure. In view of the two discrete procedures involved, it is better for the performance of CPR at this stage to be performed by two rescuers, one performing EAR and the other ECC on the one casualty.

When two rescuers are available, CPR procedure should proceed at the rate of five compressions (ECC) to one inflation (EAR) for an initial period of one minute in the case of an adult, one operator performing ECC in five second cycles at the rate of one compression per second, and the other operator performing EAR timing his/her action to make one inflation of the chest between the fifth compression of one cycle and the first compression of the next.

After the first minute the pulse is checked and if the pulse is returned, ECC is dispensed with and EAR is continued as previously described in two minute periods, with the pulse being further checked after each period. If the pulse is not present, the combined ECC and EAR procedure is continued for two minute periods with the pulse being checked again after each period.

In the case of children, the compression and inflation rate is changed to suit so that 5 compressions are performed at the rate of 100 per minute followed by one inflation.

If only one rescuer is available, then CPR procedure must be altered to accommodate the one person performing both ECC and EAR. In this regard, upon the rescuer determining that the pulse is absent, ECC is performed continuously for 15 chest compressions at a rate of about 80 compressions per minute, whereinafter EAR is performed for two inflations of the lungs over a period of approximately 5 seconds. Thereafter, the cycle of 15 chest compressions and 2 lung inflations is continued at this rate again for an initial period of approximately 1 minute, whereinafter the pulse is checked. If the pulse is still not present, CPR is continued to be performed for periods of two minutes with the pulse being checked at the conclusion of each two minute period for a period of no more than five seconds.

It should be noted that the pulse checking procedure is very important and determines the subsequent procedure to be performed by the rescuer.

As can be appreciated from the above description of CPR procedure, although the procedure is logical, unless it is practised regularly, it is easily forgotten. Indeed, if it is remembered, it can be difficult to perform correctly and accurately, particularly in regard to the timing rates of chest compressions and lung inflation. In practical terms, the need for practising CPR arises only in emergency situations and in the majority of cases a person may never encounter an emergency requiring the performance of CPR technique, or may only encounter the same in an unexpected occasion once or twice in a life time.

SUMMARY OF THE INVENTION

Accordingly, it is an object of the present invention to provide an apparatus which can be used by persons untrained in CPR technique or not well practised in the same, to recall and perform prescribed CPR technique, including ECC and EAR in an emergency situation, or in training or other situations requiring its use.

In accordance with one aspect of the present invention, there is provided an apparatus for prompting an operator in the performance of cardio pulmonary resuscitation (CPR) comprising:

input means for sensing an input signal input by the operator, in response to an input prompting signal output by said apparatus;

display means for displaying a plurality of visual prompting signals to said operator;

audible means for outputting an audible prompting signal to said operator; and control means for controlling the sequencing and operation of said input means, display means and audible means to generate said prompting signals in accordance with a prescribed protocol based on prescribed CPR techniques; wherein:

(i) said input prompting signals are controlled by said control means to prompt the operator to ascertain the presence of a pulse of the casualty, specify the number of rescuers performing the resuscitation, and specify the age status of the casualty;

(ii) said visual prompting signals are controlled by said control means to provide said input prompting signals and also to prompt the operator to perform either or both heart compression and lung inflation on the casualty at a prescribed rate in accordance with said CPR technique; and (iii) said audible prompting signal is controlled by said control means to supplement said visual prompting signals.

Preferably, said control means sequences and operates said input means, display means and audible means in accordance with said prescribed protocol by:

(i) initially generating said visual prompting signals for a prescribed number and rate of lung inflations in accordance with said CPR technique;

(ii) subsequently generating input prompting signals in the order of firstly prompting the operator to input a said input signal in respect of the result of the pulse check, secondly prompting the operator to input a said input signal in respect of the number of rescuers, and thirdly prompting the operator to input a said input signal in respect of the age status of the casualty;

(iii) next generating said visual prompting signals for heart compression and/or for lung inflation for a first prescribed time period dependent upon said input signals input by the operator in accordance with said CPR technique;

(iv) generating an input prompting signal prompting input of a said input signal for said pulse check after the elapse of said first prescribed time period;

(v) subsequently generating said visual prompting signals for heart compression and/or lung inflation for a second prescribed time period dependent upon said input signal input by the operator for step (iv);

(vi) repeating steps (iii) and (iv) ad infinitum; and wherein said control means only progresses from one step prompting input of a said input signal to the next step upon input of an appropriate said input signal by the operator responsible to the corresponding input prompting signal prompting input of said input signal.

Preferably, said input prompting signals are controlled by said control means to firstly prompt the operator to ascertain whether the casualty is breathing, before prompting for the pulse check result.

BRIEF DESCRIPTION OF THE DRAWINGS

The invention will be better understood in the light of the following description of several specific embodiments thereof. The description of the first embodiment is made with reference to the accompanying drawings wherein.

DETAILED DESCRIPTION OF THE PREFERRED EMBODIMENT

The first embodiment is directed towards an apparatus for prompting an operator in the performance of CPR which is portable, self contained within a case and internally powered so as to be kept within first aid kits, in vehicles, on industrial sites, in households, near swimming pools and beaches, or any place where an accident may possibly occur which may require the performance of CPR.

Figure 1:
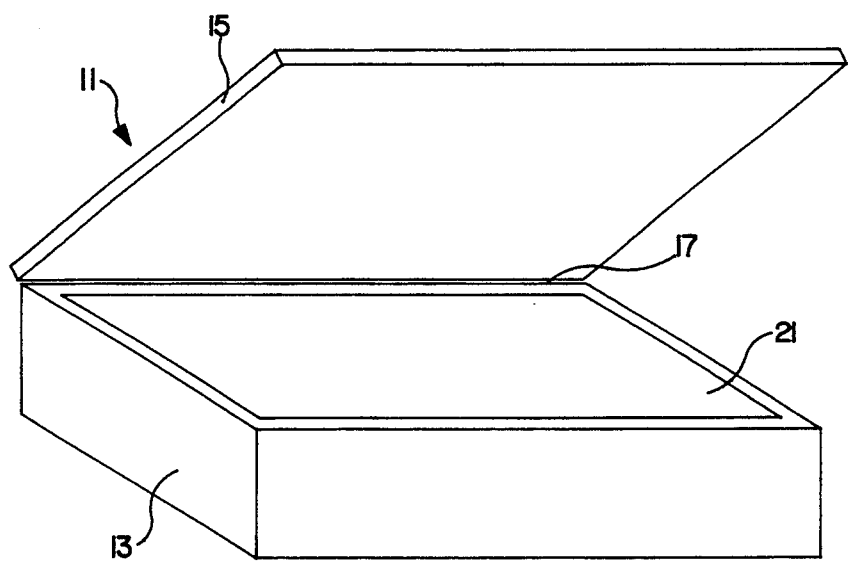
FIG. 1 is a perspective of the casing housing the apparatus.
Figure 2:
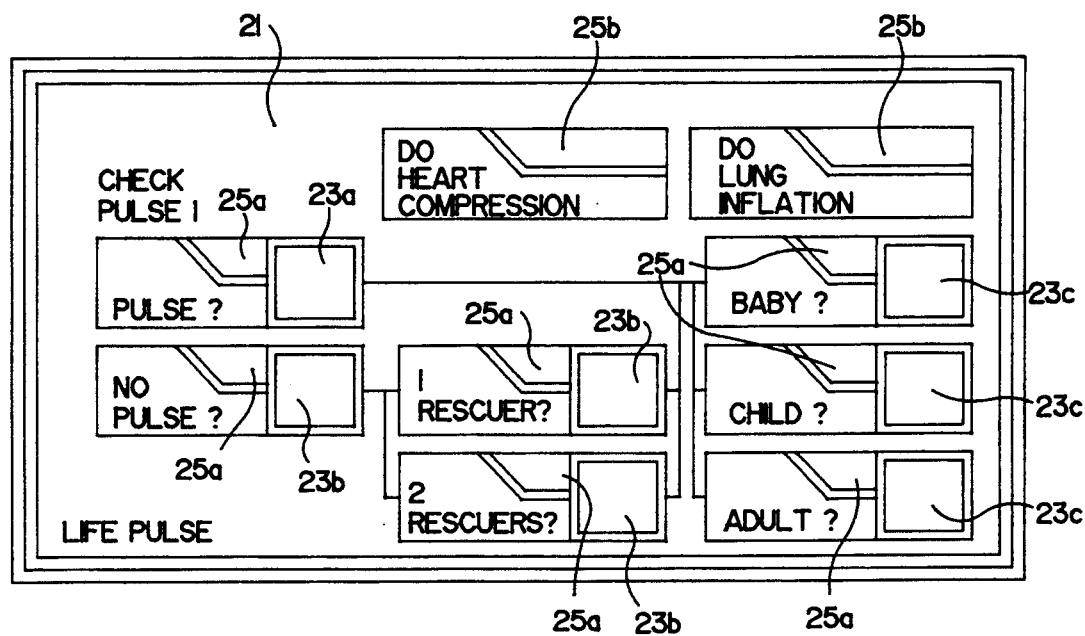
FIG. 2 is a plan view of the key pad and display means layout of the apparatus.
Figure 3A:
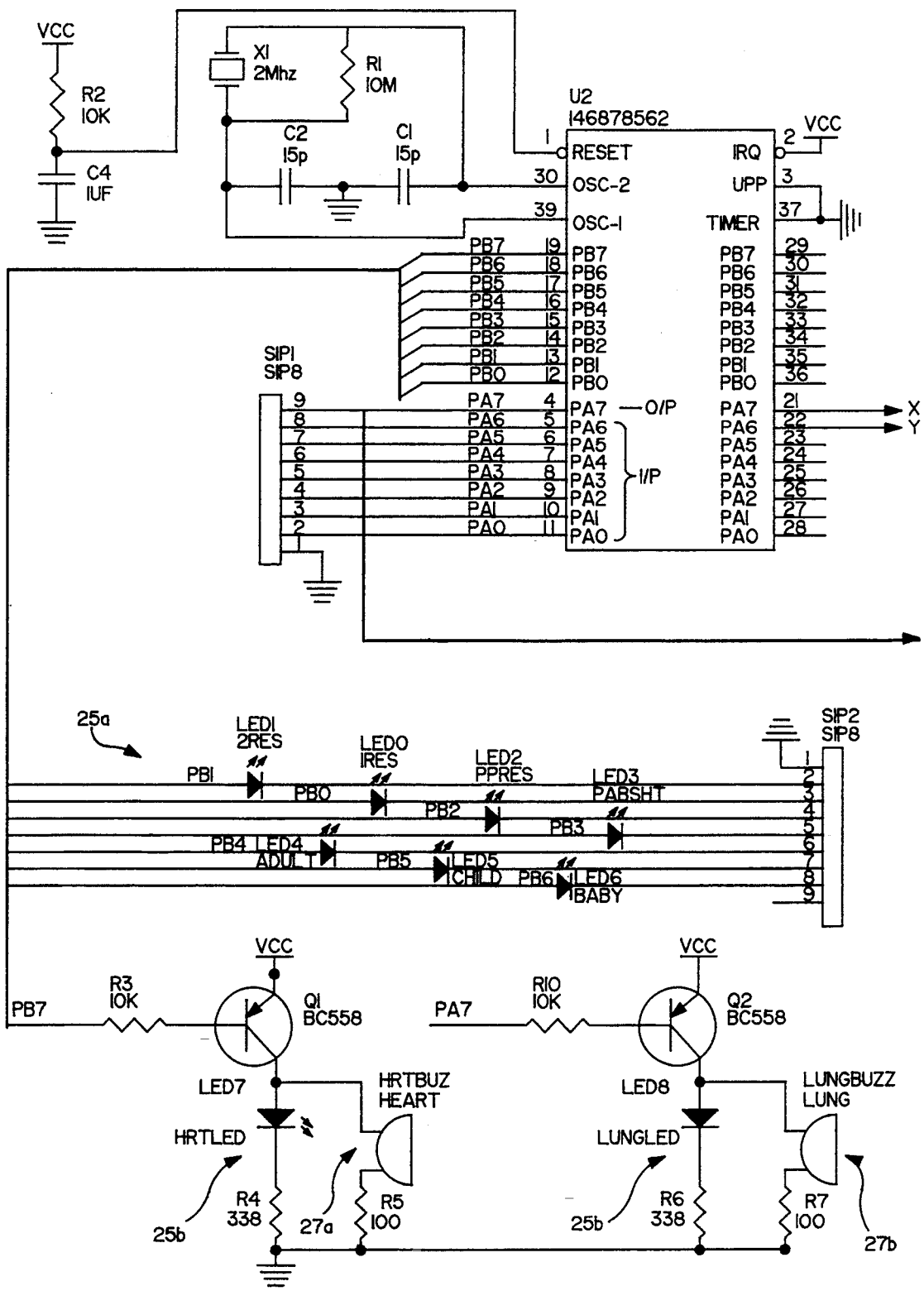
FIGS. 3A–3D form schematic diagram of the hardware circuit of the apparatus.
Figure 3B:
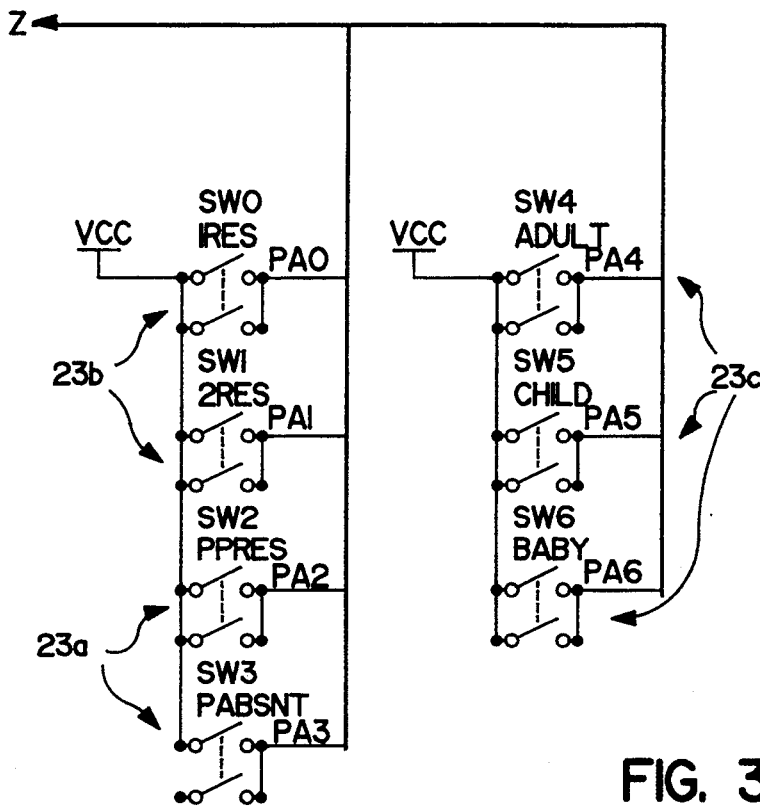
Figure 3C:
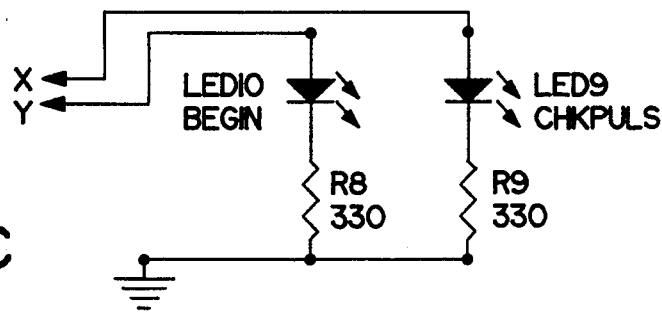
Figure 3D:
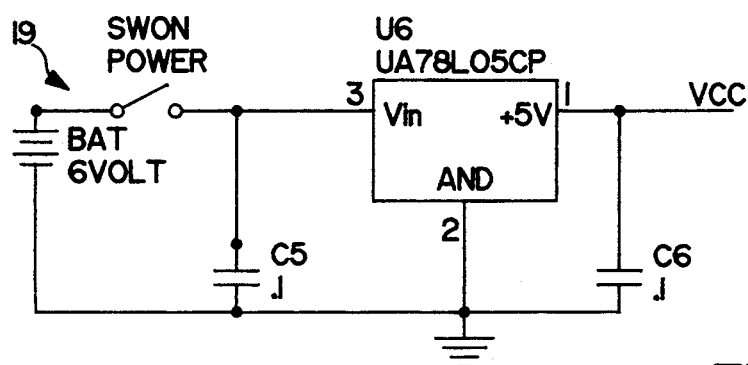

As shown at FIG. 1 of the drawings, the casing 11 is constructed in two halves, one forming the base 13 which houses the principal components of the apparatus, and the other forming the lid 15 for closing the outer face 21 of the apparatus.

The base 13 and lid 15 are hingedly interconnected by means of a hinge 17 provided along one edge which incorporates the contact points of a microswitch 19 for switching on power to the apparatus when the lid is open and for switching off power to the apparatus when the lid is closed.

The apparatus essentially comprises input means, display means, audible means and control means, all embodied in electronic circuitry which is housed within the base 13 beneath the outer face 21 of the apparatus.

The input means is associated with a membrane key pad incorporated into the outer face 21 which provides a series of tactile pressure input switches 23 disposed at prescribed locations in the outer face. Accordingly, an input signal is sensed by the input means in response to an operator of the apparatus depressing a switch 23 with finger pressure.

In the present embodiment, seven switches 23 are provided which are arranged into three groups. The first group 23a is disposed on the left hand side of the outer face 21 and provides for the input of an input signal indicating either the presence or absence of a pulse of a casualty on whom CPR is to be performed. The second group 23b provides for the input of an input signal indicating whether there is one or two rescuers. Finally, the third group 23c provides for the input of an input signal indicating the age status of the casualty, i.e. whether it is a baby, child or adult.

The display means is also incorporated into the outer face 21 and comprises a series of light emitting devices in the form of diodes 25 (LEDs) which are arranged into two groups, one group 25a associated and disposed correspondingly adjacent to each respective tactile switch 23 and the other group 25b disposed separately of the tactile switches 23 towards the top of the outer face 21. The first group of LEDs 25a provide an input prompting signal of a visual form to the operator to visually prompt the operator to input an input signal to one of the tactile switches within one of the groups of switches 23. On the other hand, the second group of LEDs 25b provide a visual prompting signal signifying the performance of a heart compression or lung inflation in accordance with the required performance of ECC or EAR, respectively.

The audible means is provided in the form of a pair of piezoelectric buzzers 27, respectively associated with the LEDs 25b. The buzzers 27 output audible prompting signals at two different tones, one high and the other low to respectively supplement the corresponding LEDs 25b. Moreover, one buzzer 27a is dedicated to producing an audible prompting signal at one tone in synchronism with the display means outputting a visual prompting signal from the LED 25b indicating heart compressions, and the other buzzer 27b is dedicated to producing an audible prompting signal in synchronism with the display means outputting a visual prompting signal from the LED 25b indicating lung inflations. In addition to supplementing the operation of the group of LEDs 25b, the buzzers 27 also produce audible prompting signals in the form of input prompting signals to supplement the operation of the LEDs 25a in prompting the operator to input an input signal. In order to distinguish the latter manner of operation of the buzzers from their dedicated operation indicating heart compressions and lung inflations, both buzzers 27 sound in unison when providing an input prompting signal.

In the present embodiment, the buzzers sound providing an input prompting signal only in connection with pulse checks requiring an input signal to be input via the tactile pressure switches 23a.

The control means is housed entirely within the base 13 of the casing and beneath the outer face 21 of the apparatus, and comprises electronic circuitry mounted upon an appropriate circuit board in the conventional way.

In the present embodiment, the control means comprises microprocessor based circuitry which operates in accordance with computer program software stored within an electronic memory provided within the circuitry.

Having particular regard to FIGS. 3A–3D of the drawings, the microprocessor circuitry comprises an 8-bit EPROM micro computer unit U2, a crystal clocking circuit X1, R1, C1 and C2, a reset circuit R2 and C4, an input data bus PA0 to PA6 connected to a serial inport port resistor package SIP1 to SIP8 and the tactile switches 23, and an output data bus PA7 and PB0 to PB7 connected to the LEDs 25a and serial input port resistor package SIP2 to SIP8, and also to the LEDs 25b and piezoelectric buzzers 27 via transistor switches Q1 and Q2. Power is supplied to the circuit by means of a battery BAT and regulator circuit including filtering capacitors C5 and C6 and regulator integrated circuit U6.

As is shown in the drawings, an input data line connected to a tactile switch SW0 to SW6 goes high upon closing the switch 23 and goes low upon opening the switch.

In the case of the LEDs 25a, any of the LEDs LED1 through to LED6 will be illuminated upon the particular output line connected thereto going high. Accordingly, with the output line going low, the LED will be extinguished.

With regard to the heart compression and lung inflation circuits, corresponding heart compression LED LED7 and piezo buzzer HRTBUZ will be respectively activated to produce visual prompting signals simultaneously upon the output line PB7 connected to the base of the transistor Q1 going low. Similarly with respect to the lung inflation circuit, LED8 and piezo electric buzzer LUNGBUZZ will both simultaneously issue a visual prompting signal and audible prompting signal respectively upon the output line PA7 connected to the base of the transistor Q2 going low.

This hardware configuration of the apparatus is operated in accordance with the computer program software stored within the EPROM of the microcomputer unit U2. In the present embodiment the microcomputer unit U2 is in the form of an MC1468705G2 integrated circuit, wherein the size of the EPROM is 2 kilobytes and the computer program software is mask written into the microcomputer in assembly language.

Figure 4:
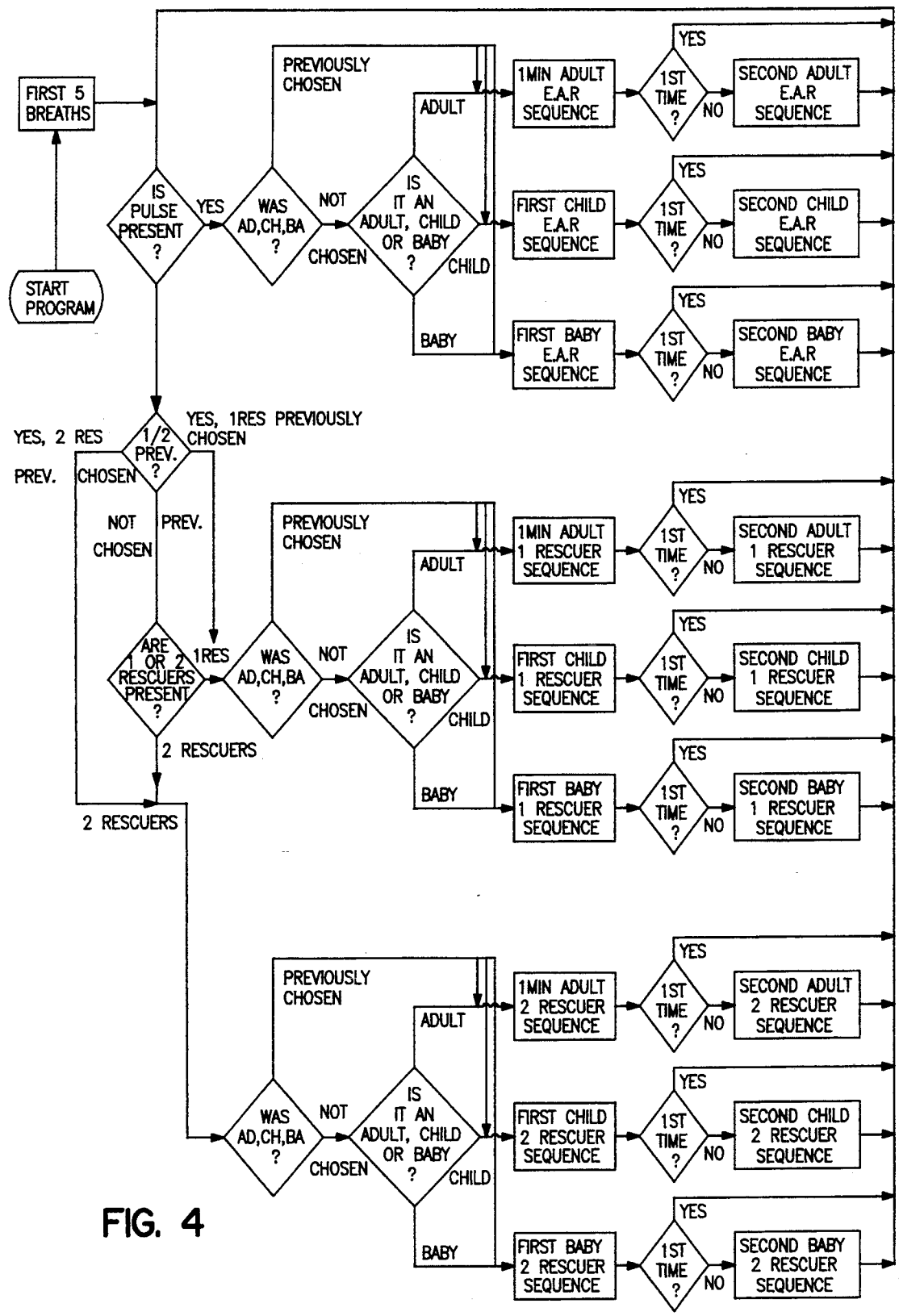
FIG. 4 is a functional flow chart depicting the algorithm performed by the software of the apparatus.

The algorithm of the computer program is represented in flow chart form at FIG. 4 of the accompanying drawings, and as shown includes three principal software routines, the performance of which is determined by the particular input signal which is input to the apparatus by the operator in response to appropriate input prompting signals output by the apparatus.

In this flow chart, the large diamond shaped boxes indicate the output of input prompting signals for decision making purposes, the smaller diamond shaped boxes represent internal decision making performed by the control means, and the rectangular boxes represent internal processing performed initially by the control means and subsequently in response to a previously made decision. The barrel shaped box represents the start program which is performed by the control means after the lid 15 is opened and the switch 19 is closed. As shown at FIG. 3 of the drawings, this program is initiated after the capacitor C4 of the reset circuit charges to a threshold voltage in response to the battery BAT supplying power to the Vcc supply rail, triggering the operation of the microcomputer U2.

As shown in FIG. 4 of the drawings, the first routine is performed immediately after opening the lid and invoking the start program. This routine directs the performance of the five quick breath sequence, whereby the control means selectively outputs appropriate visual and audible prompting signals on the output line PA7 to flash and sound LED8 and LUNGBUZZ were appropriate.

Upon completion of the five breath sequence, the program then proceeds to the first decision making routine which outputs the particular input prompting signal requesting whether a pulse is present on the casualty or not.

After an affirmative input signal is input by the operator, the program proceeds with making an internal decision as to whether the age status of the casualty has been entered, namely whether it is an adult, child or baby. In the case of this status not being previously input, a further input prompting signal is issued requesting an appropriate input signal to be input by the operator regarding this information.

The program then performs an appropriate EAR sequence sub-routine at the appropriate rate for the first time period, dependent upon the age status of the casualty. Accordingly, appropriate output signals are output by the microcomputer U2 along the output line PA7 to operate the lung inflation circuitry.

After completing this sequence, an internal decision is made again to determine whether the previously completed EAR sequence was the first such sequence performed. If so the program returns to the pulse check decision and accordingly issues appropriate input prompting signals to determine further operation. If it was not the first sequence, then the program proceeds with performing the second EAR sequence sub-routine for the second prescribed time period (i.e. two minutes in the case of an adult and scaled down for children and babies).

Upon completing the second EAR sequence sub-routine, the program returns to perform the pulse check decision once more and so on.

It should be noted that the internal decision making sub-routines of the program enables the control means to avoid repeating an earlier program sequence for the input of age status information which was previously entered into the apparatus.

The second and third principal routines involve the performance of CPR technique and are arranged so that the second routine is performed in response to the input means sensing an input signal indicative of there being only one rescuer, and the third routine is performed in response to the input means sensing an input signal indicating that there are two rescuers.

Again, in order to facilitate efficient operation of the apparatus, an internal decision making sub-routine determining whether the number of rescuers has previously been set, is performed prior to the control means providing an external input prompting signal requesting the number of rescuers to be input by the operator into the apparatus. Accordingly, the latter decision making sub-routine can be bypassed when the second or third routines are recycled after performing the pulse check sub-routine at the completion of each cycle.

Upon determining whether there are one or two rescuers available, the program proceeds with the appropriate routine in a similar manner as to the performance of the first routine except that the first and second EAR sequences are replaced by first and second CPR sequences.

It should be noted that at the conclusion of either the first or subsequent second CPR sequences, the program returns to the pulse check sub-routine in each case. This provides for the dual purpose of not only prompting a pulse check, but also facilitates branching out into the EAR sequence alone upon a rescuer sensing the return again of the pulse, whereinafter the ECC aspect of CPR need no longer be performed. Furthermore, the pulse check is maintained to enable the control means to branch out into the full CPR routine, incorporating ECC when a pulse is no longer sensed, thus enabling the EAR sequence alone to be terminated and the full CPR sequence to be invoked.

It should be further noted that in all of these scenarios, the program avoids the performance of redundant sub-routines which would otherwise output input prompting signals for the operator to input information which was already entered during the initial prompting sequence.

Now describing the operation of the apparatus from the view point of an operator, in order to start the apparatus the lid 15 of the casing is opened, whereupon the visual and audible prompting signals are caused to be issued by the control means to flash the LEDs and sound the buzzers, to indicate that the unit is functional. Subsequently, the operator is prompted to perform the five quick breath sequence and then to enter the first input signal, namely whether the pulse of the casualty is absent or present.

If the pulse is present, indicating the need to perform the EAR sequence alone, the control means proceeds directly to request whether the casualty is an adult, baby or child, i.e. the age status. Once the appropriate input signal is input by the operator, the correct resuscitation sequence begins with prompting the required inflation rate for an initial sequence corresponding to approximately one minute duration in the case of an adult, and scaled down with respect to children and babies. After this initial period, the control means then ceases prompting and alerts the rescuer to re-check the pulse by sounding a different intermittent tone and flashing the pulse option LEDs. Should the pulse still be present, then the inflation sequence will continue for two full sequences, (i.e. two minutes in the case of an adult) before again requesting a pulse check. This procedure then repeats continuously.

Should the pulse be no longer present, then the operator will be directed to follow the CPR routine. Moreover, the control means causes the apparatus to proceed with requesting whether one or two rescuers are present. After this information is keyed in, then the apparatus requests whether the patient is an adult, baby or child. Once this is selected then the correct resuscitation sequence begins with prompting the required inflation and heart compression rate for an initial sequence corresponding to approximately one minute duration in the case of an adult.

After this initial period, the control means then ceases prompting and alerts the operator to re-check for a pulse by sounding the different intermittent tone and flashing the pulse option LEDs. Should the pulse still be absent, the sequence will continue now for two full sequences, (i.e. two minutes in the case of an adult) before again requesting a pulse check. If the pulse has returned, then the operator is directly taken to the EAR sequence described above, without the need to re-enter the casualty's status, as this was already entered. Subsequently, the inflation only sequence continues unless the regular pulse check causes the sequence to change again.

The apparatus can be reset to its initial state at any stage by simply closing the lid 15, thereby turning it off. Opening the lid again will commence the start program again. When not in use, the lid is closed, thereby not causing the circuit to consume standby power.

The second embodiment is substantially identical to the preceding embodiment except that the microcomputer unit U2 instead of being an 8-bit EPROM microcomputer unit is a 4-bit EPROM microcomputer unit.

As can be seen in the previous embodiment, the two banks of output data lines PC and PD are not used hence enabling a less expensive 4-bit microcomputer to be utilised. In this embodiment, the chosen microcomputer unit is the uPD7556A integrated circuit.

This microcomputer unit has a smaller onboard EPROM, namely having a capacity of one kilobyte of information, but in the present embodiment this is quite adequate to contain the computer program software.

The apparatus of the present invention has many advantages, including:

1. All prompting for keyboard inputs is annunciated by flashing LEDs alongside the possible choices. Once keyed, the selected choice is signalled by a constantly illuminated LED.
2. The apparatus stops inflation/compression prompting to force the rescuer(s) to check at the correct intervals for the presence or absence of a pulse, and re-enter this information as a safety measure before proceeding.
3. The above pulse checking prompt is initially performed, in the case of an adult, after approximately a one minute duration followed by every two minutes, which is in accordance with correct CPR technique.
4. If after administering CPR, the pulse check determines that the pulse has reappeared, the apparatus directly leads into EAR without further information being required for input.
5. Facility is also provided for changing from an EAR sequence to CPR sequence, and requesting additional information as required regarding the number of rescuers available.
6. The apparatus can be both quickly operated and if required quickly reset by closing its lid.

Importantly, the apparatus requires no more information that is necessary to commence the appropriate resuscitation sequence, including changes in the pulse status which require changes in the CPR sequence to be followed. This simplification of operation saves time and confusion which could otherwise have dire consequences.

It should be appreciated that the scope of the present invention is not limited to the particular embodiments described herein. In particular, minor changes in the computer program software may be envisaged to accommodate for changes in the algorithm. For example, instead of providing separate EAR and CPR sequences, for children and babies, these may be reduced down to a single sequence of operation for both. Furthermore, changes made in the apparatus to accommodate changes made in specifications set down by the Australian Resuscitation Council in the recommended CPR procedure, whereby changes in the algorithm are required, are also envisaged to fall within the scope of the present invention.

It should be appreciated that the scope of the invention is not limited to the scope of the embodiment described herein.

We claim:

1. An apparatus for prompting an operator in the performance of cardio pulmonary resuscitation (CPR) comprising:

input means for respectively sensing an input signal input by the operator in response to each one of a series of input prompting signals output by said apparatus;

display means for displaying a plurality of visual prompting signals to said operator;

audible means for outputting an audible prompting signal to said operator; and control means for controlling the sequencing and operation of said input means, display means and audible means to generate said prompting signals in accordance with a prescribed protocol based on prescribed CPR techniques;

wherein:

(i) said input prompting signals are controlled by said control means to prompt sequentially the operator to ascertain the presence of a pulse of the casualty, specify the number of rescuers performing the resuscitation, and specify the age status of the casualty;

(ii) said visual prompting signals are controlled by said control means to provide said input prompting signals and also to prompt the operator to perform either or both heart compression and lung inflation on the casualty at a prescribed rate in accordance with said CPR technique; and (iii) said audible prompting signal is controlled by said control means to supplement said visual prompting signals;

and wherein said control means sequences and operates said input means, display means and audible means in a manner whereby each input prompting signal is output in a prescribed sequence and requires a said input signal to be input by the operator in response thereto before a succeeding input prompting signal is output by said apparatus, and whereby each said input prompting signal has associated therewith a discrete input signal.

2. An apparatus as claimed in claim 1, wherein said control means sequences and operates said input means, display means and audible means by initially generating said visual prompting signals or audible prompting signal for a prescribed number and rate of lung inflations, before operating said input means for generation of said input prompting signals.

3. An apparatus as claimed in claim 1, wherein the first of said input prompting signals to be output by said apparatus is that prompting the operator to ascertain the presence of a pulse of the casualty and all successive iterations of the sequencing and operation of said apparatus by said control means commence with said first input prompting signal.

4. An apparatus as claimed in claim 3, wherein said control means sequences and operates said apparatus to output a said input control signal in respect of the age status of the casualty in response to the input of a said input signal representative of there being a pulse of the casualty present, or in the alternative, in response to the input a said input signal representative of the number of rescuers performing the resuscitation.

5. An apparatus as claimed in claim 3, wherein said control means sequences and operates said apparatus to output a said input control signal in respect of the number of rescuers performing the resuscitation in response to the input of a said input signal representative of there being no pulse of the casualty present.

6. An apparatus as claimed in claim 3, wherein said control means after sequencing and operating said apparatus to output said input prompting signals and receive said input signals in accordance with said prescribed sequence, (i) next sequences generation of said visual prompting signals for heart compression and/or for lung inflation for a first prescribed time period dependent upon said input signals input by the operator in accordance with said CPR technique;

(ii) then generating a further said input prompting signal prompting input of a said input signal for said pulse check after the elapse of said first prescribed time period;

(iii) subsequently generating said visual prompting signals for heart compression and/or lung inflation for a second prescribed time period dependent upon said input signal input by the operator for step (ii); and (iv) repeating steps (i) and (iii) iteratively;

wherein said control means only progresses from one step prompting input of a said input signal to the next step upon input of an appropriate said input signal by the operator responsive to the corresponding input prompting signal prompting input of said input signal.

7. An apparatus as claimed in claim 1, wherein said input prompting signals are controlled by said control means to firstly prompt the operator to ascertain whether the casualty is breathing before prompting for the pulse check result.

8. An apparatus as claimed in claim 1 housed within a portable, self-contained casing having a base and a lid, wherein said control means is actuated upon opening said lid and deactuated upon closing said lid.

9. An apparatus as claimed in claim 1 wherein said input means comprises a key pad providing a series of input switches arranged into at least three groups disposed sequentially across an outer face of said apparatus from one side to the other of said outer face: the first group providing for the input of said input signal indicating the presence or absence of the pulse of the casualty, the second group providing for the input of said input signal indicating whether there is one or more rescuers; and the third group providing for the input of said input signal indicating the age status of the casualty, e.g. baby or adult.

10. An apparatus as claimed in claim 1 wherein said display means comprises a series of light emitting devices for generating said visual prompting signals arranged into two groups, one group associated with said input means to provide said input prompting signals when illuminated, and the other group disposed separately to indicate the performance of a heart compression and/or lung inflation when illuminated.

11. An apparatus as claimed in claim 6, wherein there is a one-to-one correspondence between the light emitting devices comprising said one group associated with said input means and said series of input switches, and said one group of light emitting devices are disposed correspondingly adjacent to said input switches, whereby said control means activates the light emitting devices corresponding to a group of input switches to provide said input prompting signal corresponding to said group of input switches.

12. An apparatus as claimed in claim 1, wherein said audible means comprises a plurality of buzzers having different and distinctive tones to produce a plurality of said audible prompting signals, one buzzer being associated with said visual prompting signal for prompting the operator to perform a hear compression and another buzzer being associated with said visual prompting signal for prompting the operator to perform a lung inflation, such that the respective one or other buzzer sounds a corresponding audible tone in synchronism with said display means outputting a said visual prompting signal associated therewith.

13. An apparatus as claimed in claim 8, wherein said one and other buzzers are also associated with at least said input prompting signal for prompting the operator to ascertain the presence of a pulse of the casualty, such that said one and other buzzers sound their corresponding audible tones in unison and in synchronism with said display means outputting a said visual prompting signal for said input prompting signal associated therewith.

* * * * *